US012706081B2

(12) United States Patent
Benedetto

(10) Patent No.: US 12,706,081 B2
(45) Date of Patent: Aug. 11, 2026

(54) SIMULATING CROWD NOISE FOR LIVE EVENTS THROUGH EMOTIONAL ANALYSIS OF DISTRIBUTED INPUTS

(71) Applicant: Sony Interactive Entertainment Inc., Tokyo (JP)

(72) Inventor: Warren M. Benedetto, Foothill Ranch, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 296 days.

(21) Appl. No.: 17/332,992

(22) Filed: May 27, 2021

(65) Prior Publication Data

US 2022/0383849 A1 Dec. 1, 2022

(51) Int. Cl.

*G10L 13/027* (2013.01)
*G10L 15/08* (2006.01)
*H04L 67/10* (2022.01)

(52) U.S. Cl.

CPC ............ *G10L 13/027* (2013.01); *G10L 15/08* (2013.01); *H04L 67/10* (2013.01)

(58) Field of Classification Search

CPC ....... G10L 13/027; G10L 15/08; H04L 67/10; A63F 13/28; A63F 13/424; A63F 13/65; A63F 13/54; A63F 13/215; H04N 21/233; H04N 21/4781

See application file for complete search history.

(56) References Cited

U.S. PATENT DOCUMENTS

| | | | | |
|---|---|---|---|---|
| 10,300,394 | B1 | 5/2019 | Evans et al. | |
| 2009/0103896 | A1 | 4/2009 | Harrington | |
| 2009/0238378 | A1 * | 9/2009 | Kikinis ................ | H04N 13/296 381/92 |
| 2013/0250101 | A1 | 9/2013 | Lavery | |

(Continued)

FOREIGN PATENT DOCUMENTS

| | | | |
|---|---|---|---|
| JP | 2009530680 | A | 8/2009 |
| WO | 2019236556 | A1 | 12/2019 |

OTHER PUBLICATIONS

PCT/US2022/030381, Notification of Transmittal of the International Search Report and the Written Opinion of the International Searching Authority, or the Declaration, PCT/ISA/220, and the International Search Report, PCT/ISA/210, Sep. 29, 2022.

*Primary Examiner* — Daniel C Washburn
*Assistant Examiner* — Sean E Serraguard
(74) *Attorney, Agent, or Firm* — Kilpatrick Townsend & Stockton LLP

(57) ABSTRACT

Methods and systems are provided for generating crowd noise related to a media event being presented using a cloud service is provided. The method includes receiving audio data captured from a viewer of the media event. The method includes processing the audio data to identify utterances of the viewer. In one embodiment, features of the utterances are classified to build a reaction model for identifying reaction states of the viewer. The method includes producing a soundscape for the crowd noise, the soundscape blends together audio of generic crowd noise related to the media event and audio corresponding to one or more of said reaction states of the viewer. In one embodiment, the soundscape is output to a speaker associated with presentation of the media event to the viewer.

14 Claims, 11 Drawing Sheets

(56) References Cited

U.S. PATENT DOCUMENTS

| | | | | |
|---|---|---|---|---|
| 2013/0279701 | A1 | 10/2013 | Harrington | |
| 2015/0297949 | A1* | 10/2015 | Aman | G06T 7/246 348/157 |
| 2019/0173682 | A1 | 6/2019 | Kempf | |
| 2019/0270018 | A1* | 9/2019 | Evans | A63F 13/79 |
| 2020/0074181 | A1* | 3/2020 | Chang | H04N 21/8456 |
| 2020/0118312 | A1* | 4/2020 | Ahuja | G06V 40/19 |
| 2020/0225844 | A1* | 7/2020 | Lerner | G06F 3/0482 |
| 2021/0264909 | A1* | 8/2021 | Reece | G06V 10/774 |
| 2021/0286423 | A1* | 9/2021 | Correia | H04S 7/303 |
| 2021/0335345 | A1* | 10/2021 | Cameron-Kidd | G06F 40/295 |
| 2021/0377615 | A1* | 12/2021 | DeWitt | H04N 21/41415 |
| 2022/0114390 | A1* | 4/2022 | Baughman | G06F 18/213 |
| 2022/0254368 | A1* | 8/2022 | Waine | G10L 15/18 |
| 2022/0329881 | A1* | 10/2022 | Soman | H04N 21/41407 |
| 2022/0337886 | A1* | 10/2022 | Orellana Gonzalez | H04N 21/2187 |
| 2023/0169989 | A1* | 6/2023 | Darcy | G10L 21/0324 704/278 |

* cited by examiner 702 704 706 406 708 120 710

| Viewer Customized Soundscape Output | | | | | | | | | | |
|---|---|---|---|---|---|---|---|---|---|---|
| | | Customized Soundscape Output | | | | | | | | |
| | | | Viewer Reaction State | | | | | | View Personal Setting Adjustment | |
| User | Time | Generic Crowd Noise | Happy | Angry | Sad | Stress | Excited | Total percentage | Setting 1 (Team) | Setting 2 (Audio Setting) |
| Viewer-1 | tn | 25% | 20% | 10% | 10% | 10% | 25% | 100% | Home team | 1.0 |
| Viewer-2 | tn | 25% | 20% | 10% | 10% | 10% | 25% | 100% | Home team | 3.0 |
| Viewer-3 | tn | 50% | 25% | 0% | 0% | 0% | 25% | 100% | Away team | 2.0 |
| Viewer-4 | tn | 50% | 25% | 0% | 0% | 0% | 25% | 100% | Home team | 1.0 |
| Viewer-5 | tn | 0% | 25% | 25% | 25% | 0% | 25% | 100% | Away team | 2.0 |
| Viewer-6 | tn | 0% | 25% | 25% | 25% | 0% | 25% | 100% | Home team | 8.0 |
| Viewer-7 | tn | 75% | 5% | 5% | 5% | 5% | 5% | 100% | Home team | 6.0 |
| Viewer-8 | tn | 75% | 5% | 5% | 5% | 5% | 5% | 100% | Away team | 2.0 |
| Viewer-9 | tn | 75% | 5% | 5% | 5% | 5% | 5% | 100% | Away team | 1.0 |
| | | | | | | | | | | |
| Viewer-N | tn | 20% | 20% | 20% | 20% | 0% | 20% | 100% | Home | 3.0 |

Fig. 7

SIMULATING CROWD NOISE FOR LIVE EVENTS THROUGH EMOTIONAL ANALYSIS OF DISTRIBUTED INPUTS

BACKGROUND

1. Field of the Disclosure

The present disclosure relates generally to generating crowd noise for viewers viewing a media event, and more particularly to methods and systems for generating crowd noise related to a media event being presented using a cloud service.

2. Description of the Related Art

The video game industry has seen many changes over the years. In particular, the media events such as E-sports have seen a tremendous growth in terms of the number of live events, viewership, and revenue. However, recently, E-sports events and other media events (e.g., sports events, concerts, music festivals, etc.) have been negatively affected because of the COVID-19 pandemic. In order to minimize the spread of COVID-19, many jurisdictions have restricted or limited public gatherings such as at E-sports events and other live media events. Today, media events are being held with a limited number of in-person attendees where online viewers can view the media event remotely from the safely and comfort of their home. To this end, developers have been seeking ways to develop sophisticated operations that would improve the crowd noise for media events so that the crowd noise sounds more realistic and authentic to the viewers.

A growing trend in the video game industry is to develop unique ways that will enhance the experience of online viewers watching the media content from a remote location. Because of capacity restrictions and a limited number of in-person attendees being able to attend a live showing of a media event, generic crowd audio noise is artificially generated and incorporated into the media content to simulate the sound of a live crowd in attendance of the media event. Unfortunately, many remote viewers may find that the audio of the generic crowd noise sounds unrealistic, lifeless, boring, and detracts from the sound of cheering from a live crowd. As a result, the current process of using an artificially simulated generic crowd noise to represent the sound of the crowd noise at the media event may sound too unauthentic and may result in viewers losing interest in the media event.

It is in this context that implementations of the disclosure arise.

SUMMARY

Implementations for this for the present disclosure include methods, systems, and devices relating to generating crowd noise related to a media event being executed by a cloud service. In some embodiments, methods are disclosed to enable the verbal expressions of viewers and its corresponding reactions to be used for producing a soundscape for the crowd noise, where the soundscape blends together audio of generic crowd noise related to the media event and audio corresponding to one or more reaction states of the viewer. For example, a viewer may be remotely watching the gameplay of players competing in an E-sports event (e.g., media event) where the event is held in an empty stadium without live attendees (or a limited number of attendees) physically present at the stadium. Since the stadium has a limited number of attendees physically present at the stadium, instead of using only a generic crowd noise to replicate the sound of a live crowd cheering for their favorite team and players, the methods disclosed herein outline ways of producing a soundscape for the crowd noise so that the crowd noise sounds realistic such that a large crowd is in attendance watching the players compete in the event.

Thus, as a remote viewer reacts and cheers for their favorite team and players during the event, the utterances of the viewer are captured and processed to build a reaction model. In some embodiments, the reaction model can be used to identify reaction states of the viewer which can be used to produce a soundscape for the crowd noise. In this way, as the viewer watches the media event, the soundscape is output to a speaker of the viewer so that the viewer can receive a soundscape that includes an accurate representation of a live crowd reacting to what is occurring in the media event.

In one embodiment, a method for generating crowd noise related to a media event being presented using a cloud service is provided. The method includes receiving audio data captured from a viewer of the media event. The method includes processing the audio data to identify utterances of the viewer. In one embodiment, features of the utterances are classified to build a reaction model for identifying reaction states of the viewer. The method includes producing a soundscape for the crowd noise, the soundscape blends together audio of generic crowd noise related to the media event and audio corresponding to one or more of said reaction states of the viewer. In one embodiment, the soundscape is output to a speaker associated with presentation of the media event to the viewer.

In another embodiment, a method for generating crowd noise related to a media event being presented to a plurality of viewers using a cloud service is provided. The method includes receiving audio data captured from the plurality of viewers of the media event. The method includes processing the audio data to identify utterances of the plurality of viewers. In one embodiment, features of the utterances are classified to build a reaction model for identifying reaction states of the plurality of viewers. The method includes producing a soundscape for the crowd noise. In one embodiment, the soundscape blends together audio of generic crowd noise related to the media event and audio corresponding to one or more of said reaction states of the plurality of viewers.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 7 is an exemplary illustration showing a viewer customized soundscape output based on the preferences of the viewer, in accordance with an implementation of the disclosure.

DETAILED DESCRIPTION

Figure 1A:
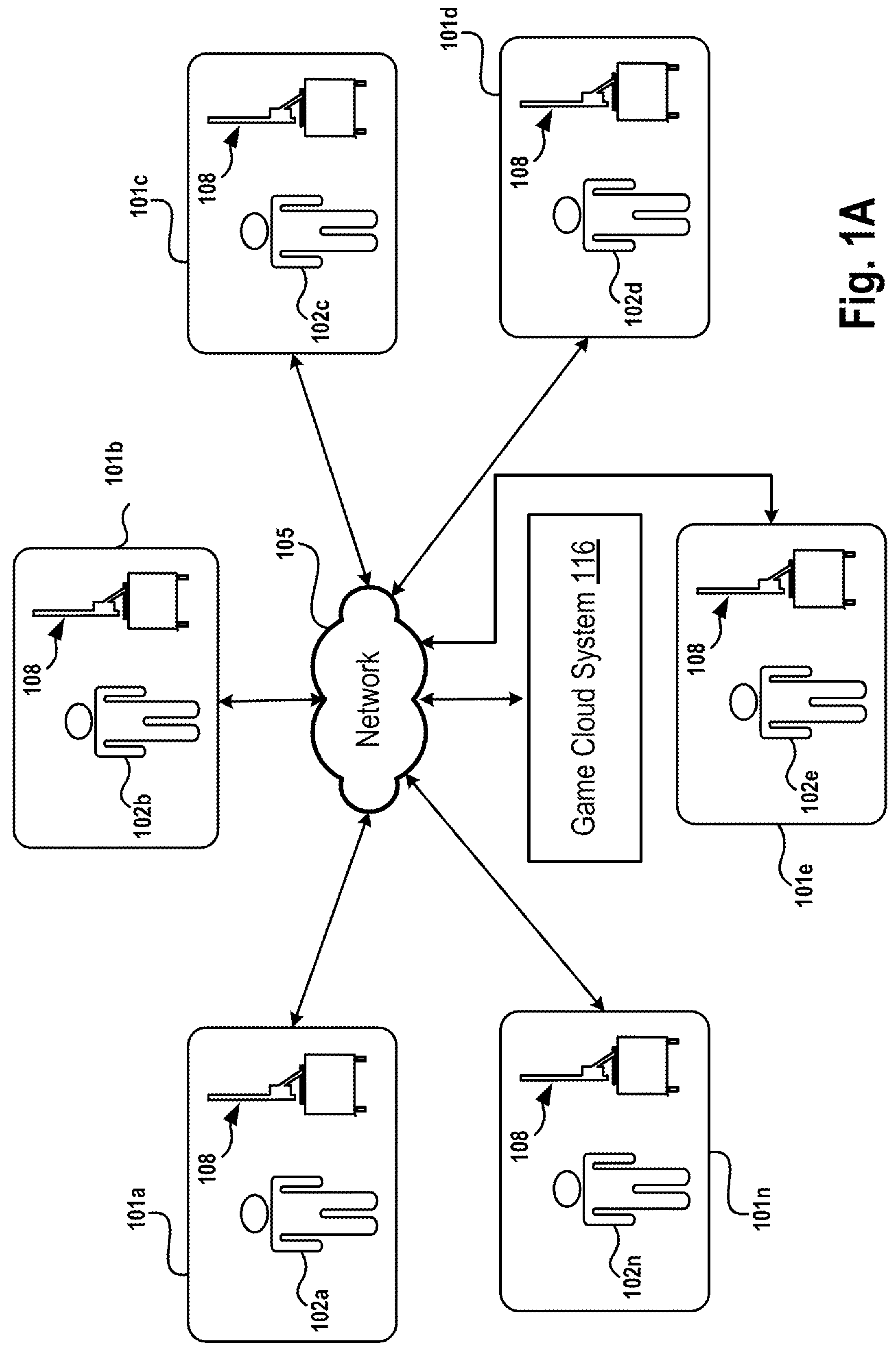
FIG. 1A illustrates an embodiment of a system that is configured to generate crowd noise related to a media event and to output the crowd noise to a plurality of viewers watching the media event, in accordance with an implementation of the disclosure.

The following implementations of the present disclosure provide methods, systems, and devices for generating customized crowd noise related to a media event being presented using a cloud service. In one embodiment, the media event may be a live or recorded event such as an E-sports event, a sporting event, a concert, a music festival, a theatrical performance, a comedy show, etc. For example, while viewing a media event from a remote location that includes the gameplay of players competing against each other in a live E-sports event, the viewer may comment, cheer, and verbally react to what is occurring in the gameplay. The voice output and utterances (e.g., spoken words, statements, vocal sounds, etc.) produced by of the viewer can be captured, processed, and used to produce a soundscape of custom generated crowd noise related to the media event. In one embodiment, producing a soundscape of the crowd noise for the viewer may enhance the viewing experience of the viewer, e.g., by providing more realistic crowd noise that is custom generated using voice inputs from one or more viewers. In some embodiments, the soundscape for the crowd noise may provide the viewer with a simulated experience of watching the media event live in-person with other viewers of the media event.

For example, while watching a sports event that involves an American football game, a viewer watching the football game from their home can comment and verbally cheer for their favorite players and team. The utterances of the viewer are continuously captured and processed while viewing the event to build a reaction model that can be used for identifying reaction states of the viewer. In one embodiment, the reaction states of the viewer can be blended together with generic crowd noise related to the football game to produce a soundscape for the crowd noise. In some embodiments, the soundscape can be output to speakers associated with the viewer while watching the football game. Generally, the methods described herein provides a way for generating crowd noise related to a media event so that the crowd noise accurately reflects the sound of a live crowd watching the media event in-person. In turn, the viewing experience of viewers watching the media event remotely can be improved which may result in the viewer having a desire to continue watching the media event and other content related to the media event.

As used herein, the term "soundscape" should be broadly understood to refer to sound or combination of sounds that forms or arises from an immersive environment. For purposes of clarity, references to "soundscape" should be taken in the general broad sense to include the blending of sounds of generic crowd noise occurring at the venue of a live or recorded media event, e.g., fans cheering, booing, clapping, signing, screaming etc., and additional simulated noises that correspond to voices, utterances and/or emotions captured of the viewer or a specific group of viewers.

In one embodiment, the soundscape is generated in a customized way, such that generic crowd noise can be combined or blended with additional simulated noises that are correspond to utterances, emotions, reactions captured of one or more viewers. In one embodiment, the added simulated noises are not live sounds from the captured voices, utterances, or reactions, but instead are generated to best represent or correspond to the intensities and/or emotions detected in the voices captured from views. In one embodiment, these additional simulated noises can be accessed from a noise database. The noise database may have hundreds or thousands of sounds that relate to specific types of events, and the system will select combinations of those sounds or files from the database (e.g., producing a composite blend of sounds from the database) to generate the added simulated noises (which are then blended with the generic crowd noise). To the viewers, the added simulated noises delivered in the soundscape will be influenced by the viewers' capture voices and emotions, but also influenced by the voices and emotions captured from others (e.g., the voices, utterances and emotions of their friends that are co-watching an event online). By way of example, the soundscape may resemble the real live sounds a user would experience in a stadium, where sounds and emotions heard by a user may be in part generated by the viewer but also persons in and around the viewer or in different parts of the stadium. This being said, the additional simulated noises may also be influenced by others viewing the event remotely, e.g., friends or non-friends of the viewer.

By way of example, in one embodiment, a method is disclosed that enables generating crowd noise related to a media event being presented using a cloud service. The method includes receiving audio data captured from a viewer of the media event. In one embodiment, the method may further include processing the audio data to identify utterances of the viewer. In one example, the features of the utterances are classified to build a reaction model for identifying reaction states of the viewer. In another embodiment, the method may include producing a soundscape for the crowd noise. In one example, the soundscape blends together audio of generic crowd noise related to the media event and audio corresponding to one or more of the reaction states of the viewer. The audio that is blended with the generic crowd noise may be accessed from a database and would be representative of the types of sounds, voices, utterances and emotions detected from the viewers. In another embodiment, the soundscape is output to a speaker associated with the presentation of the media event to the viewer. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for generating crowd noise related to a media event being presented to viewers using a cloud service. For example, a plurality of viewers may be connected to view a media event such as a live E-sports event. In one embodiment, the system includes a connection to a network. In some embodiments, a plurality of viewers can be connected over a network to view players competing against one another in the live E-sports event. In some embodiments, the plurality of viewers may be connected to a cloud service over the network where the cloud service is configured to execute the game and enable connections to a plurality of viewers when hosting the live E-sports event or other media event. The cloud service may be configured to receive, process, and execute data from a plurality of devices controlled by the viewers.

In some embodiments, as the plurality of viewers watches the live E-sports event, the cloud service is configured to receive and process audio data from the plurality of viewers to produce a soundscape for the crowd noise related to live E-sports event. In some embodiments, the soundscape is output to speakers associated with the presentation of the live E-sports event to provide the viewers with a simulated crowd noise that would occur at the venue of the live E-sports event if the venue was filled with fans. In one embodiment, the cloud service may include an audio data machine learning processor that is configured to process the audio data of the viewers and to identify utterances for building a reaction model. In some embodiments, the reaction model can be used to identify reaction states of the viewer which can be used to produce a soundscape for the crowd noise related to the media event.

With the above overview in mind, the following provides several example figures to facilitate understanding of the example embodiments.

FIG. 1A illustrates an embodiment of a system that is configured to generate crowd noise related to a media event and to output the crowd noise to a plurality of viewers watching the media event. In one embodiment, FIG. 1 illustrates a plurality of viewers 102*a*-102*n*, a network 105, and a cloud service 116. As illustrated in FIG. 1, each viewer 102 is shown watching the media event on a display screen 108 of the viewer. In one embodiment, the media event can be displayed on a mobile device of the viewer or any other device such as a personal computer, a laptop, a tablet computer, a monitor and console/PC setup, a television and console setup, a peripheral device, a tablet, a thin client, a set-top box, a network device/appliance, etc. In some embodiments, the plurality of viewers 102*a*-102*n* can be optionally dispersed at different geographical locations 101*a*-101*n*. For example, viewers 102*a*-102*b* may be viewing the media event from Japan while viewers 102*c*-102*n* can be dispersed in different regions of the world.

In some embodiments, the media event that is presented to the viewer may be an E-sports event, a video game, a movie, a sporting event, a concert, a music festival, a theatrical performance, a comedy show, etc. In one embodiment, the media event is a live event or a recording of the event. In one example, the media event can be watched live in-person, remotely from any geographical location, or from any remote geographical location with other viewers as a group. In some embodiments, the media event is provided by a television network that is hosting the media event, e.g., ESPN™, NBC™, CBS™, ABC™, Fox™ MLB™ Network, NBA™ TV, NFL™ Network, etc. In some embodiments, as provided by the television network, the media event may include generic crowd noise related to the media event. In some embodiments, the generic crowd noise may vary and depend on the particular type of media event that is selected by the television network. For example, the generic crowd noise may include canned crowd noise, chatter of a crowd, or a generic sound of a crowd reacting in response to a specific action in the media event. Although the generic crowd noise provides a better viewing experience relative to having it silent without any crowd noise, the generic crowd noise may become too repetitive and unauthentic which may result in the viewers being disengaged with the media content. For example, using generic crowd noise for a game action where a team scored a gaming winning point in a Championship game may make the event appear unrealistic and may not be a true representation of what it would sound like if there was a live crowd attending the Championship game.

In some embodiments, the cloud service 116 is configured to present the media event to the plurality of viewers 102*a*-102*n*. In one example, the cloud service 116 may be a media entertainment service provider such as a PlayStation Network that can be used watch a telecast of the media event provided by a television network. In one embodiment, the cloud service 116 is connected to the plurality of viewers 102*a*-102*n* over the network 105. In some embodiments, the cloud service 116 is configured to maintain and execute a media event or a video game selected by the viewers 102. In one embodiment, the cloud service 116 is configured to receive inputs from the viewers 102 watching the media event. For example, in one embodiment, as the viewer 102 watches the media event, the viewer verbally expresses and reacts to what is occurring in the media event. In one embodiment, the verbal expressions and reactions (e.g., utterances) of the viewer is captured by microphone and processed by the cloud service 116. In other embodiments, the cloud service 116 is configured to receive inputs such a video recording of the facial expression of the viewer, text messages that is provided by the viewer view a keyboard or a device, or phrases and chants that are selectable by the viewer via a menu. For example, a menu can be provided to the device of the viewer. The menu may include a variety of phrases or words of encouragement that can be selected by the viewer, e.g., defense, let's go, you can do it, etc. In one embodiment, the selected phrase can be received by the cloud service 116 as an input and used for producing the soundscape of the crowd noise.

In one embodiment, the cloud service 116 is configured to capture and receive audio data from the viewers 102 of the media event. The audio data which includes the captured utterances of the viewers can be processed by the cloud service 116 to produce a soundscape for the crowd noise related to the media event. In one embodiment, the produced soundscape may include a blend of audio of the generic crowd noise related to the media event and audio corresponding to one or more of reaction states of the viewer watching the media event. In some embodiments, the cloud service 116 is configured to output the produced soundscape and transmit it to the viewers watching the media event. In one embodiment, the soundscape is output to a speaker associated with the presentation of the media event. In this way, the viewing experience of the viewers 102 are enhanced since the audio associated with the media event includes audio corresponding to the reaction states of the viewer rather than only the generic crowd noise that is provided by the television network.

Figure 1B:
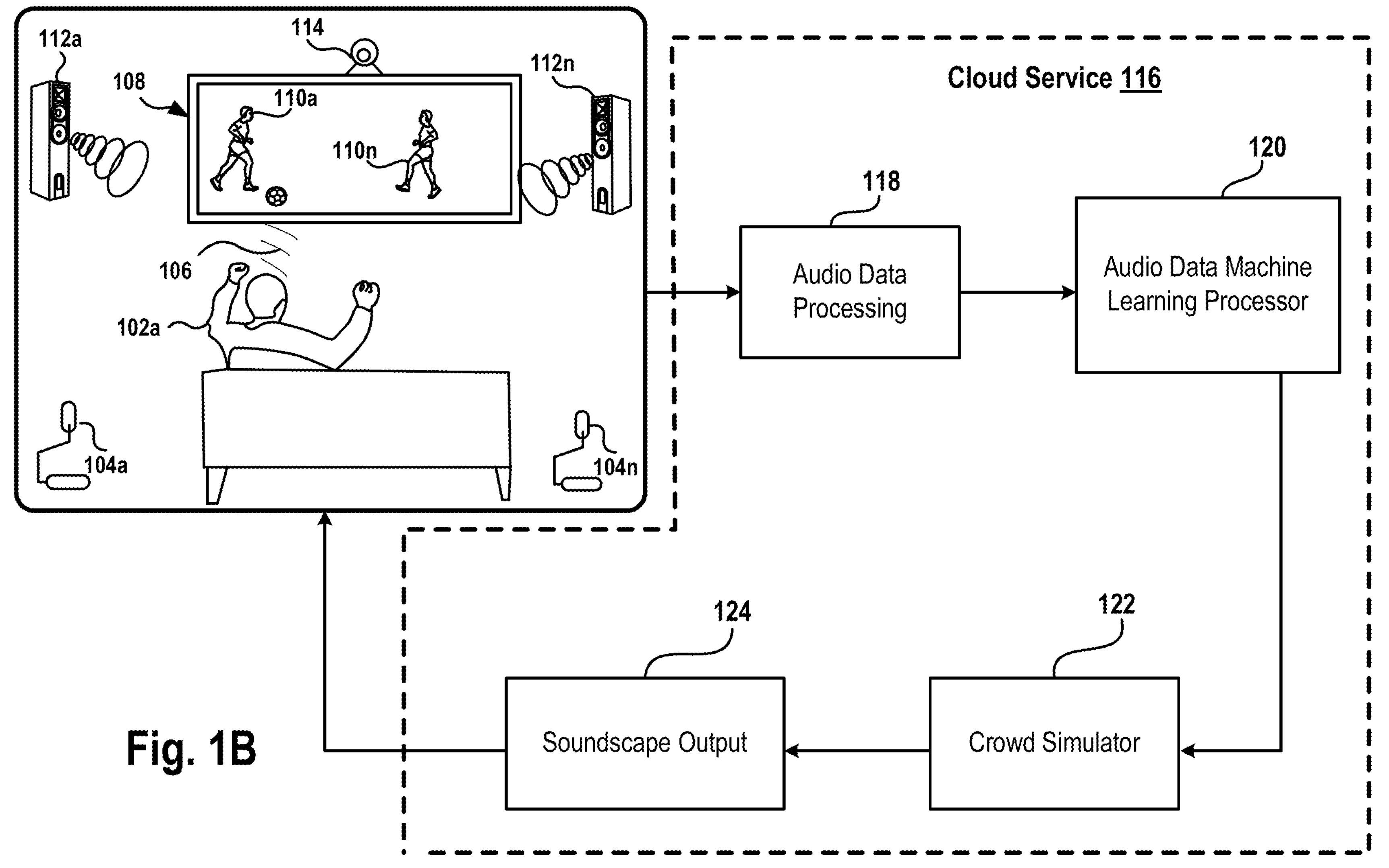
FIG. 1B illustrates an embodiment of a cloud service receiving audio data captured from a viewer of a media event and processing the audio data to produce a soundscape for the crowd noise related to the media event, in accordance with an implementation of the disclosure.

FIG. 1B illustrates an embodiment of a cloud service 116 receiving audio data captured from a viewer 102 of a media event and processing the audio data to produce a soundscape output 124 for the crowd noise related to the media event. In one embodiment, the viewer 102 can be connected to the cloud service 116 over a network. In some embodiments, the viewer 102 may be watching a media event from any geographic location. In one example, as illustrated in FIG. 2, viewer 102*a* is shown watching a media event on a display screen 108 which includes players 110*a*-110*n* competing in a live soccer match. As the viewer 102 watches the soccer match, microphones 104*a*-104*n* are configured to capture the voice output 106 (e.g., audio data) produced by the viewer 102 or sound from the environment where the viewer 102 are located. In some embodiments, the microphone 104 may be integrated with a device of the viewer such as a television, a controller, a mobile phone, a personal computer, a laptop, a smart speaker, or any other device that might be present in the environment of the viewer.

For example, as the viewer 102 watches the soccer match, the viewer 102 may comment, cheer, shout, scream, and react to what is occurring the soccer match. The utterances (e.g., spoken words, statements, vocal sounds, etc.) made by of the viewer 102 while watching the soccer match can be captured by a microphone 104 and processed by the cloud service 116 to produce a soundscape of the crowd noise related to the soccer match. As further illustrated in FIG. 1B, the soundscape is output to one or more speakers 112 associated with presentation of the media event to the viewer 102. In other embodiments, the speaker 112 may be integrated with a device that is presenting the media event or be part of a surround sound speaker system that is configured to deliver the soundscape to the viewer. In another embodiment, a camera 114 can be used to capture the facial expression of the viewer as the viewer watches the media event. In one embodiment, the facial expression of the viewer can be analyzed and processed to determine the mood and emotion of the viewer while watching the media event.

In some embodiments, in addition to displaying the media event on the display screen 108, the cloud service 116 is configured to generate a noise meter (not shown) for display on the display screen 108. In some embodiments, the noise meter can be used to hype up the viewers and encourage the viewers to make more noise and be more verbally expressive. For example, a noise meter can be displayed on the display screen 108 along with the media event. The noise meter can provide the viewers with an indication of how much noise is being captured from all of the viewers watching the media event. When the system determines that it needs more audio data for processing, the noise meter may provide an indication to the viewers to encourage the viewers to produce more noise and to be more vocal, e.g., cheer louder, yell, scream, etc.

As further illustrated in FIG. 1B, the cloud service 116 is configured to receive the utterances (e.g., audio data) of the viewer as the viewer watches the media event. In one embodiment, the cloud service 116 includes an audio data processor 118, an audio data machine learning processor 120, and a crowd simulator 122 that is configured to receive, process, and produce a soundscape output 124 for output to the speaker 112 of the viewer 102.

In one embodiment, the audio data processor 118 is configured to receive the audio data of a viewer for processing to identify utterances of the viewer. As noted above, the utterances of the viewer may be any combination of spoken words, statements, vocal sounds expressed by the viewer. In other embodiments, the audio data processor 118 is configured to identify sound intensities associated with each utterance of the viewer. In some embodiments, each utterance may have a corresponding sound intensity level, emotion, mood, or any other speech characteristics associated with the utterance. The sound intensity level is associated with the loudness of the sound perceived by a person. For example, a viewer is watching a media event that involves a soccer match of a championship game. When the team that the viewer is supporting scores a game winning goal, the viewer verbally expresses the words "Yes! we won!" which is processed by the audio data processor 118 to identify the sound intensity level associated with the verbal expression of the user. In some embodiments, the sound intensity level associated with the utterances of the viewer can be based on the context of what is occurring in the media event and the meaning of the words expressed by the viewer.

After the audio data processor 118 processes the audio data to identify the utterances of the viewer 102, an audio data machine learning processor 120 is configured to process the output from the audio data processor 118. In one embodiment, the audio data machine learning processor may include a feature extraction operation is configured to identify features associated with the utterances and a classifiers operation that is configured to classify the features using one or more classifiers. In some embodiments, the audio data machine learning processor 120 includes a reaction model where to the reaction model is configured to receive the classified features. In one embodiment, the reaction model can be used for identifying reaction states of the viewer.

In some embodiments, the crowd simulator 122 is configured to produce a soundscape for the crowd noise related to the media event. In one embodiment, using the reaction model to identify the reaction states of the viewer, the crowd simulator 122 is configured to blend together audio of generic noise related to the media event and audio corresponding to the one or more reaction states of the viewer. After producing the soundscape output 124, the soundscape output 124 can be transmitted the viewers 102 while watching the media event. In one embodiment, the soundscape output 124 is delivered to the one or more speakers 112 associated with the presentation of the media event to the viewer 102. In this way, the soundscape includes both the generic crowd noise and audio corresponding to the reaction states of the viewer which may enhance the viewing experience of the viewer.

In some embodiments, the audio data processor 118 operation and the audio data machine learning processor 120 operation may be local to a mobile device of the viewer or any other device such as a personal computer, a laptop, a tablet computer, a television, etc. In one embodiment, since the audio data of a viewer is processed locally on a device of the viewer to identify the viewer reaction states, latency can be minimized which can prevent delays in the viewer receiving the soundscape output 124. In other embodiments, processing of the audio data and identifying the reaction states of the viewer locally on the device of the viewer may help facilitate data privacy since the audio data of the viewer is processed locally on the device and not transmitted through a communication channel. In some embodiments, this may also reduce costs associated with transmitting the audio data over the network since only the reaction states of the viewer is transmitted to the cloud service 116 over the network.

After the audio data machine learning processor 120 operation identifies the viewer reaction states, the viewer reaction states are received by the cloud service 116 for processing by the crowd simulator 122. For example, a viewer 102 watching an NFL football game shouts out loud, "you idiot!," in response to the quarterback fumbling the football. The voice output (e.g., you idiot!) is captured by a microphone 104 which is processed locally on a device of the viewer. The local device may include an embedded audio data processor 118 operation and an audio data machine learning processor 120 that is configured to identify the reaction states corresponding to the voice output (e.g., you idiot!). Once the reaction state is identified and the corresponding score is generated for the reaction state, e.g., emotional state: anger; score: 7, the reaction state and the corresponding score is received by the cloud service 116 for further processing by the crowd simulator 122.

Figure 2A:
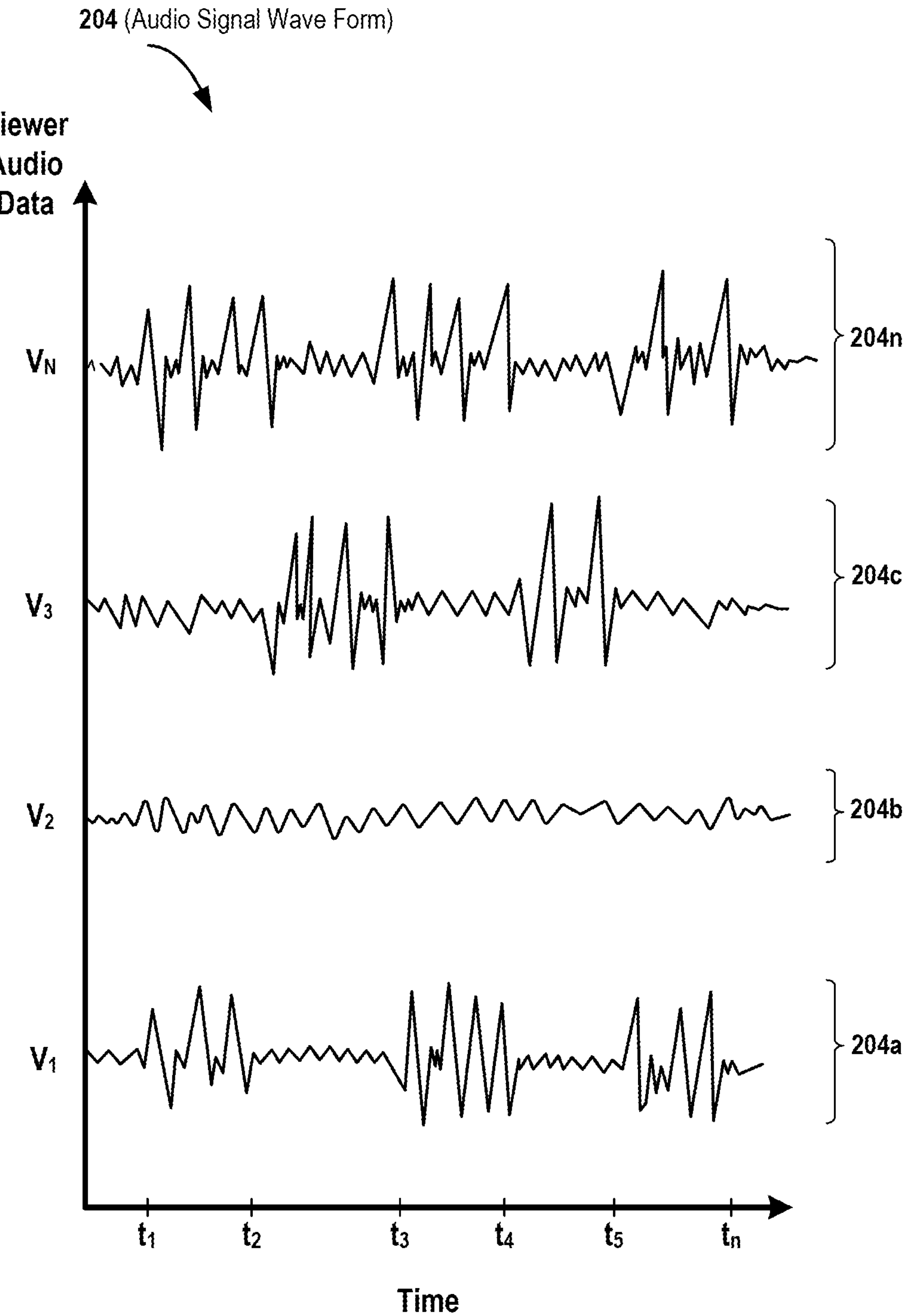
FIG. 2A is an exemplary illustration showing various audio signal waveforms associated with the voice output of the viewers 102 of the media event, in accordance with an implementation of the disclosure.

FIG. 2A is an exemplary illustration showing various audio signal waveforms associated with the voice output (e.g., audio data) of the viewers 102 of the media event. As shown in the illustration, each voice output associated with a viewer is represented by an audio signal waveform 204*a*-204*n* over a time period, e.g., t1-*tn*. While viewing the media event, each viewer 102 may verbally comment, cheer, and react to the various actions occurring in the media event. In some embodiments, each audio signal waveform may have different amplitudes, frequencies, and magnitudes.

For example, audio signal waveform 204*b* is associated with the voice output of viewer 102*b*. The audio signal waveform 204*b* indicates that the waveform is constant (e.g., minimal changes over time period) which may indicate that the viewer 102*b* is not making any verbal expressions, or that the viewer 102*b* is quietly whispering. In another example, the audio signal waveform 204*a* associated with the voice output of viewer 102*a* indicates that the audio signal waveform 204*a* is fluctuating over time. The audio signal waveform associated with the voice output of a viewer may include a plurality of utterances with periods of pauses in which the viewer is not making any verbal expressions. For example, at time period t1-t2, viewer 102*a* may be verbalizing the phrase "Defense, Defense." At time period t3-t4, viewer 102*a* may be verbalizing the phrase "Block Him." At time period t5-*tn*, viewer 102*a* may be verbalizing the phrase "Yes, Nice." Conversely, at time periods t2-t3 and t4-t5, the viewer 102*a* may be silent and the microphone of the viewer is only capturing the background noise of the viewer. Accordingly, each voice output of a viewer 102 is received and examined by the cloud service 116 to identify periods of utterances and silence of the viewer for processing to build a reaction model.

Figure 2B:
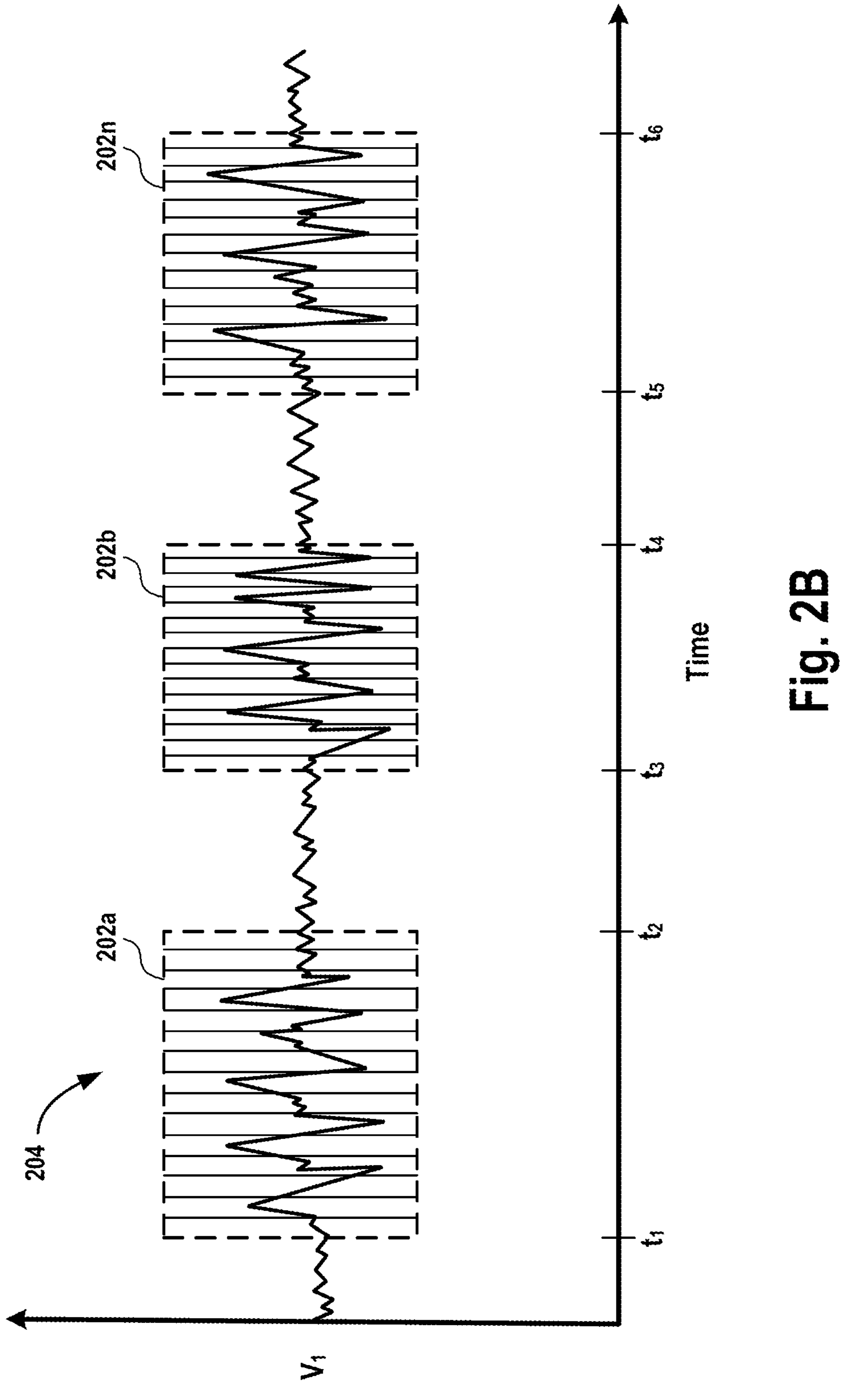
FIG. 2B is an exemplary illustration showing the audio signal waveform corresponding to the voice output of a viewer while viewing a media event, in accordance with an implementation of the disclosure.

FIG. 2B is an exemplary illustration showing the audio signal waveform 204*a* corresponding to the voice output (e.g., audio data) of viewer 102*a* while viewing a media event. In one embodiment, the voice output of the viewer 102*a* is received and processed by the audio data processor 118 of the cloud service 116. In some embodiments, the audio data processor 118 is configured to identify the utterances of the viewer. For example, as illustrated in FIG. 2B, over the time period, t0-*tn*, utterances 202*a*-202*n* are identified by the audio data processor 118. As noted above, the utterances may be spoken words, statements, vocal sounds, etc. made by the viewer 102 while watching the media event. As illustrated, utterance 202*a* occurred between time period t1-t2, utterance 202*b* occurred between time period t3-t2, and utterance 202*n* occurred between time period t5-*tn*. In between periods where no utterances have been identified, e.g., t2-t3 and t4-t5, the viewer 102*a* may be silent and not verbally reacting to the media event.

In some embodiments, each utterance 202*a*-202*n* may be divided and segmented into different time slices. For example, utterance 202*a* may be divided into forty separate time slices. In one embodiment, each of the different separate time slices may have different reaction states. For example, while watching a media event of an American football game, the utterance 202*a* may be associated with the verbal reaction, "yes!, no!." The verbal reaction of the viewer 102 may be in response to a game action in the football game where a player that the viewer 102 is cheering for intercepts the football but immediately drops the football. Accordingly, the verbal reaction of the viewer and utterances, e.g., yes!, no!, may include a hybrid of different emotional reaction states. Accordingly, utterance 202*a* may include both verbal reactions, e.g., yes!, no!, where the utterance 202*a* may have different reaction states. In one example, the verbal reaction, "yes!," may correspond to a reaction state that includes an emotion type such as excitement, happiness, surprised, etc. Whereas the verbal reaction, "no!" may correspond to a reaction state that includes an emotion such as type anger, sadness, disgust, scared, etc.

Figure 3:
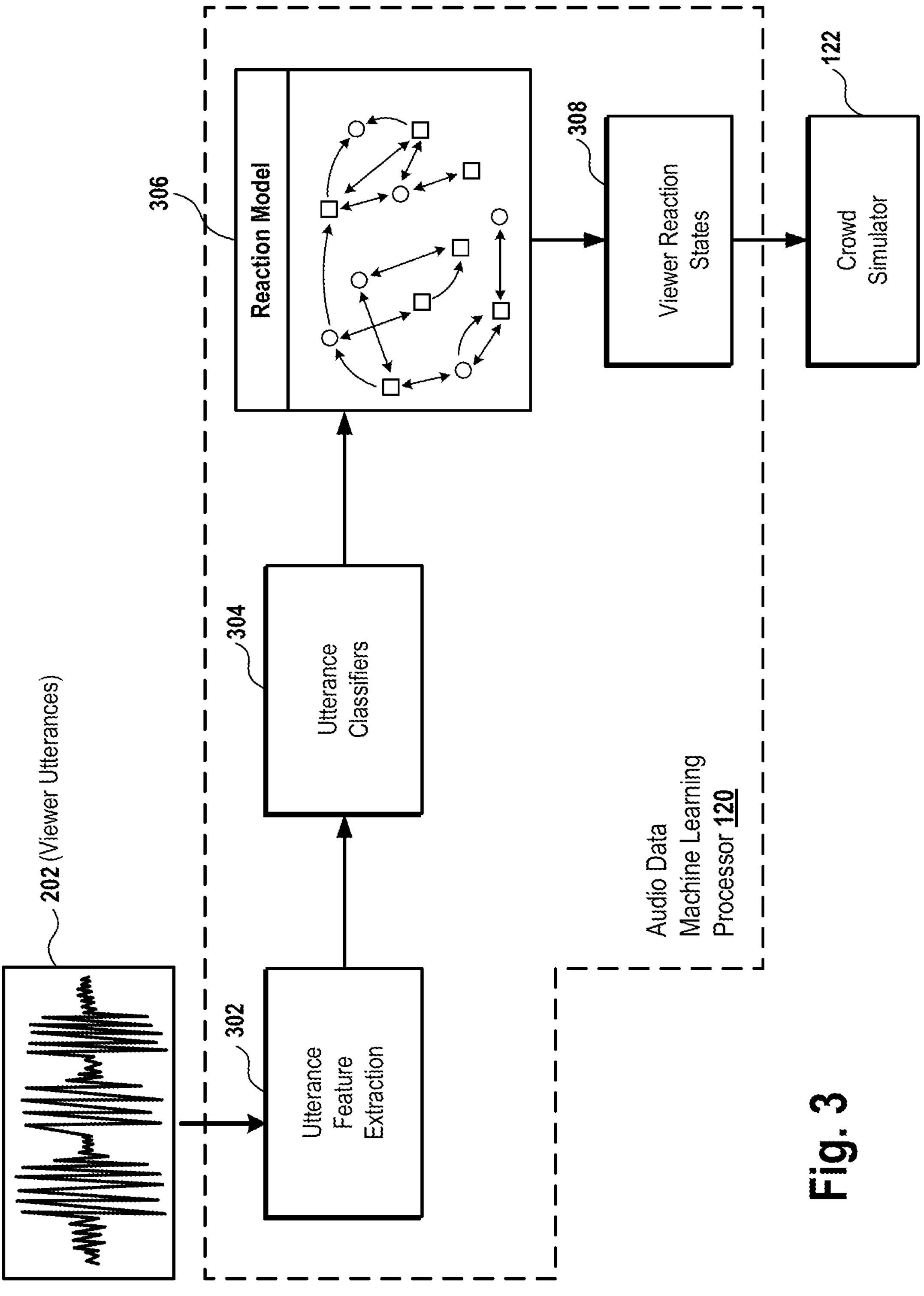
FIG. 3 illustrates an embodiment of an audio data machine learning processor receiving utterances of the viewer for processing to build a reaction model that is used for identifying viewer reaction states of the viewer, in accordance with an implementation of the disclosure.

FIG. 3 illustrates an embodiment of an audio data machine learning processor 120 receiving utterances 202 of the viewer 102 for processing to build a reaction model 306 that is used for identifying viewer reaction states 308 of the viewer 102. As shown in FIG. 3, after the utterances 202 of the viewer 102 are identified by the system, the audio data machine learning processor 120 may receive the utterances as an input. In one embodiment, the audio data machine learning processor 120 may include an utterance feature extraction 302 operation that is configured to extract and identify features from the utterances 202. After the features are identified by the utterance feature extraction 302 operation, an utterance classifiers 304 operation is configured to classify the extracted features associated with the utterances of the viewer. In some embodiments, the features are labeled using a classification algorithm for further refining by the reaction model 306.

In some embodiments, the reaction model 306 can be configured to receive as input the classified features from the utterance classifiers 304 operation. Using classified features as inputs, the reaction model 306 can be used to for identifying the reaction states of the viewer 102 which can be used for producing a soundscape for the crowd noise. In some embodiments, the reaction states of the viewer 102 may include various emotional characteristics and emotion types corresponding to the utterances of the viewer such as joy, sadness, fear, anger, surprise, disgust, contempt, panic, etc. For example, a viewer may be watching a media event that includes a soccer match where a team that the viewer is supporting is behind by one-point with 90 seconds remaining in the game. When the viewer verbally expresses the phrase, "Go Team," the reaction model 306 can be used to identify the reaction state corresponding to the asserted phrase which includes an emotion type of "fear" since the viewer's team is on the verge of losing the game. Accordingly, in one embodiment, the reaction model 306 may take into consideration the context of the media event (e.g., which team the viewer is rooting for, viewer's favorite players, game actions, points scored, etc.) when identifying the reaction states of the viewer 102.

In some embodiments, the reaction model 306 may initially be based on a global model which can be trained using global features of other viewers that are similar to the viewer 102. Over time, based on the utterances 202 of the viewer 102, the reaction model 306 will be trained to understand the reaction states of the viewer. Accordingly, the reaction model 306 is built over time and becomes more specific to the viewer 102. As the reaction model 306 receives more datasets, the reaction model 306 improves and the accuracy of the predicted viewer reaction states 308 improves and becomes more useful and applicable to the viewer 102.

In one embodiment, the reaction model 306 is configured to use a machine learning model to generate a score for the utterances 202 of the viewer 102. In some embodiments, each utterance 202*a*-202*n* may be segmented into different time slices and include an emotion profile with various emotional states. For example, a segment of an utterance 202 of a viewer may have an emotion profile that includes various emotional states such as happiness, sadness, anger, and disappointment, etc. For the particular segment, the reaction model 306 may provide a score for each emotional state which can range between 0-10. A value of '10' for an emotional state may indicate that the corresponding emotion has an intensity that is at a maximum. Conversely, a value of '0' for an emotional state may indicate that the corresponding emotion has an intensity that is insignificant. For example, a segment of an utterance 202 of a viewer may correspond to a viewer verbally expressing the word, "YES!," when the viewer's favorite player hits a game winning home run to score a run in a baseball game. The reaction model 306 may assign a value of '10' for an emotional state corresponding to "happiness" since the viewer's favorite player hit a game winning home run. Conversely, for an emotional state corresponding to "sadness," the reaction model 306 may assign a value of '0' since the viewer shows no indication of being sad. Accordingly, each utterance 202 and each of the segments of the utterance may be provided with a score which can used for generating the soundscape.

In some embodiments, the viewer reaction states 308 may include one or more emotional states associated with the utterances of the viewer while reacting to the media event. In one embodiment, the one more emotional states can be scored by the reaction model 306. In some embodiments, the reaction model 306 may provide a score for each emotional state which can range between 0-10. A value of '10' for an emotional state may indicate that the corresponding emotion has an intensity that is at a maximum. Conversely, a value of '0' for an emotional state may indicate that the corresponding emotion has an intensity that is insignificant. For example, while viewing a media event, for a particular time period, the viewer 102 may have reaction states that include emotional states such as anger, excitement, and sadness and the corresponding intensity values are '1,' '8,' and '2,' respectively. In some embodiments, the viewer reaction states 308 can be used to produce a soundscape for the crowd noise related to the media event being viewed by the viewer. In one embodiment, the score associated with the emotional state can be used to select the corresponding audio from a noise database.

Figure 4:
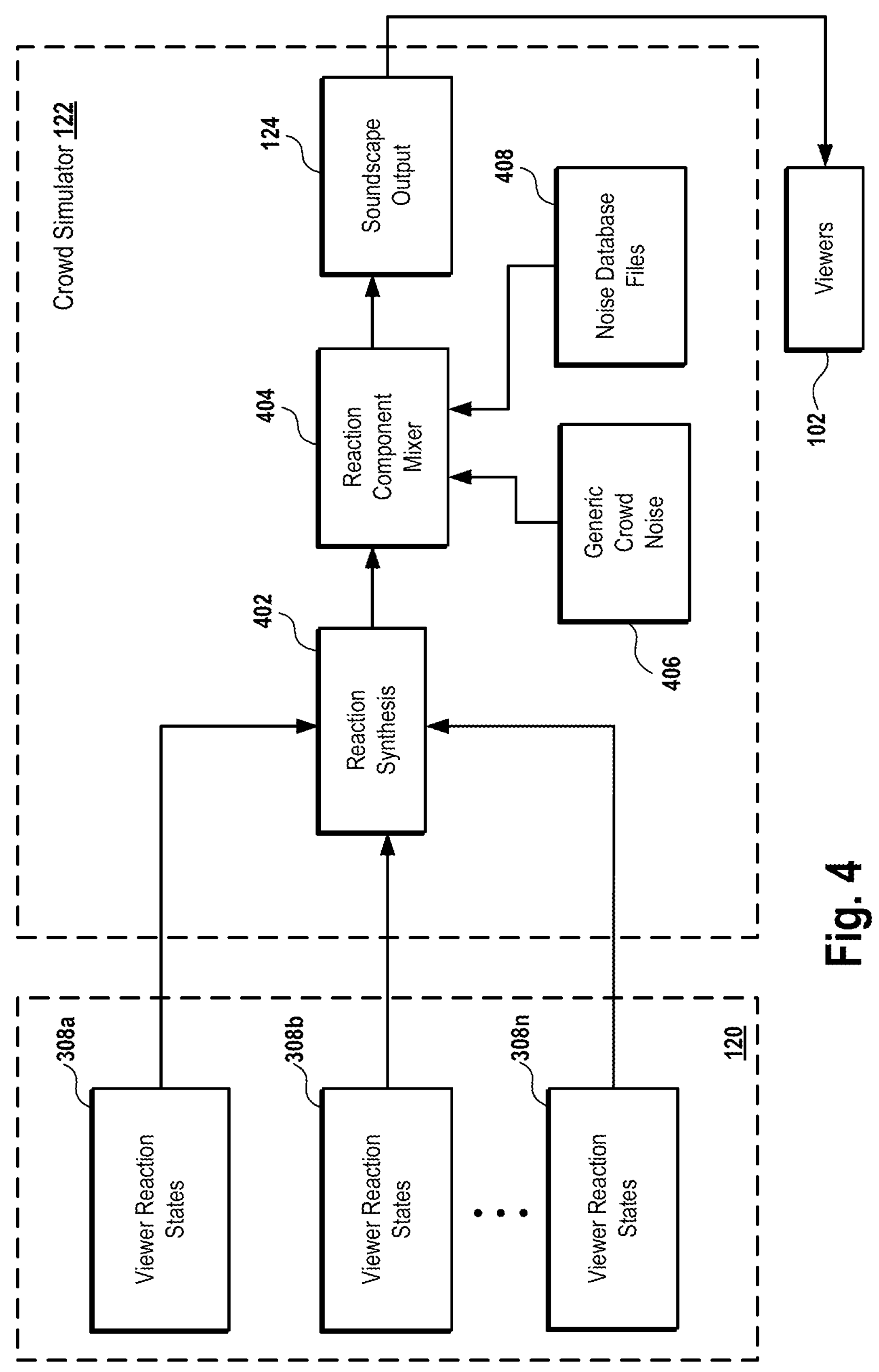
FIG. 4 illustrates an embodiment of a crowd simulator receiving viewer reaction states for processing to produce a soundscape output for the crowd noise related to a media event, in accordance with an implementation of the disclosure.

FIG. 4 illustrates an embodiment of a crowd simulator 122 receiving viewer reaction states 308*a*-308*n* for processing to produce a soundscape output 124 for the crowd noise related to a media event. As shown in FIG. 4, the system includes a crowd simulator 122 that is configured to receive viewer reaction states 308*a*-308*n* that are identified by the audio data machine learning processor 120. In one embodiment, as a plurality of viewers 102 view a media event, the voice output 106 (e.g., audio data) produced by each viewer 102 is captured and processed to identify the viewer reaction states 308*a*-308*n* that correspond to the respective voice output of the viewer. As noted above, the viewer reaction states of each viewer may include various emotional characteristics and states corresponding to the utterances of the viewer such as joy, sadness, fear, anger, surprise, disgust, contempt, panic, etc. As each viewer watches the media event, each viewer may have a different reaction states since each viewer may have different perspectives and opinions on the content that they are viewing.

As further illustrated in FIG. 4, in one embodiment, the crowd simulator 122 includes a reaction synthesis 402 operation that is configured to process and synthesize the viewer reaction states of each viewer. After the reaction synthesis 402 operation synthesizes the various reaction states of each user, a reaction component mixer 404 operation is configured to produce the soundscape output 124. Using the soundscape output 124 produced by the reaction component mixer 404, the system may provide each of the viewers 102*a*-102*n* with a soundscape for the crowd noise that is related to the media event that the viewers are watching. In some embodiments, the soundscape can be customizable for each viewer and based on the preferences of the viewer.

In one embodiment, as the viewer reaction states 308 are identified by the audio data machine learning processor 120, the reaction synthesis 402 operation is configured to receive the viewer reaction states 308*a*-308*b* associated with each viewer as inputs. Since each viewer may vocally assert various phrases with different reaction states, in one embodiment, the reaction synthesis 402 operation is configured to combine the various viewer reaction states 308*a*-308*b* associated with each viewer for further processing by the reaction component mixer 404 operation.

In one embodiment, the reaction component mixer 404 is configured to generate the soundscape output 124 for the crowd noise. In some embodiments, the reaction component mixer 404 is configured to blend together audio of generic crowd noise 406 and audio corresponding to the one or more viewer reaction states 308*a*-308*n* of the viewer 102 to produce a soundscape output 124 for the crowd noise. The audio that is blended with the generic crowd noise 406 may be accessed from a noise database 408 and would be representative of the types of sounds, voices, utterances and emotions detected from the viewers. In some embodiments, the audio of generic crowd noise 406 may be a library that includes artificial crowd noise and sound effects that are pre-recorded that simulates the sound spectators during a media event such as a sporting event. For example, the generic crowd noise 406 may include various audio files that include the sound of a crowd clapping, applauding, chanting, cheering, yelling, laughing, groaning, etc. In some embodiments, the generic crowd noise 406 may be included with the corresponding media event and produced by the television network that is hosting the media event. For example, NBC™ may be televising an NBA basketball game. The media event (e.g., NBA basketball game) may include generic crowd noise that is produced by NBC™ to simulate the sound of a live crowd during the basketball game.

In some embodiments, the audio that is blended with the generic crowd noise 406 can be accessed from the noise database 408. The audio that is blended with the generic crowd noise 406 may include simulated noises that correspond to voices, utterances, reactions, and/or emotions captured of the viewer or a specific group of viewers. In one embodiment, the noise database 408 may include pre-recorded audio files that correspond to the viewer reaction states 308*a*-308*n* of the viewer. In other embodiments, the noise database 408 may have hundreds or thousands of sounds that relate to specific types of events, and the system will select combinations of those sounds or sound files from the database to generate the audio that correspond to the viewer reaction states 308*a*-308*n* (which are then blended with the generic crowd noise 406).

Using the output of the reaction synthesis 402 operation which includes the viewer reaction states 308*a*-308*n*, the reaction component mixer 404 is configured to identify audio from the noise database 408 and correlate it with the corresponding viewer reaction states to build the soundscape of the total crowd reaction. For example, in one embodiment, the audio that corresponds to the viewer reaction states 308*a*-308*n* of the viewer is not the actual utterances of the viewer 102, instead, it is audio that corresponds to the viewer reaction states 308*a*-308*n* of the viewer is audio that is similar, parallels, mimics, or approximates the actual utterances of the viewer 102. In other embodiments, the audio in the noise database 408 may be tagged with a corresponding emotional score. In one embodiment, the emotional score can range between 1-10 and may indicate the intensity associated with the audio. In one embodiment, the emotional score of the audio in the noise database 408 can be used to select the appropriate audio that corresponds to the viewer reaction states.

For example, while watching a basketball game, a viewer may assert a profanity term such as the phrase, "crap," in response to a player missing a field goal attempt. The viewer reaction state that corresponds to the phrase, "crap," may indicate that the user is "disappointed" and the corresponding score may be a value of '7' since the player could have taken the lead in the basketball game. Accordingly, instead of using the phrase, "crap," to produce the soundscape output 124, the reaction component mixer 404 may use the noise database 408 to select an audio that corresponds to the viewer reaction state of the viewer being "disappointed" such as darn, ludicrous, ridiculous, bummer, garbage, etc. In one embodiment, since the viewer reaction has a score value of '7,' when selecting an audio that corresponds to the viewer reaction state, the reaction component mixer 404 may select an audio from the noise database 408 that has a score value of approximately '7.' In other embodiments, the reaction component mixer 404 is configured to use the actual utterances of the viewer to blend with the audio of the generic crowd noise to generate the soundscape output 410 for the crowd noise.

In some embodiments, the reaction component mixer 404 is configured to use as inputs the aggregated viewer reaction states 308*a*-308*n* from the reaction synthesis 402, the audio of generic crowd noise 406, and the audio from the noise database 408 to statistically distribute and build an accurate soundscape for the crowd noise for each particular time segment in the media event. For example, a total of 100,000 viewers may be watching a media event for an NFL football game where 65% of the viewers are fans of the home team and 35% of the viewers are fans of the away team. When the home team scores a touchdown, based on the audio data captured from the plurality of viewers, the system may determine that 50% of the viewers are reacting with an emotional state of "excitement," 15% of the viewers are reacting with an emotional state of "relief," 25% of the viewers are reacting with an emotional state of "disappointment," and 10% of the viewers are reacting with an emotional state of "anger." The various viewer reaction states of the viewer 102 can be used by the reaction component mixer 404 to select corresponding audio from the generic crowd noise 406 and corresponding audio from the noise database 408 to blend together to build the soundscape for the crowd reaction. Accordingly, the produced soundscape output 124 takes into consideration the distribution of the emotional state of the viewers that are viewing the media content which results in a realistic and accurate representation of the crowd noise. In this way, when the soundscape output 124 it provided to the viewers 102 of the media event, it provides the viewers with a realistic experience of having a full crowd in attendance at the stadium reacting to what is occurring in the media event.

In some embodiments, the soundscape output 124 may include three-dimensional (3D) audio effects to make a sound source appear anywhere in the three-dimensional space of the stadium venue where the media event is taking place. For example, the soundscape output 124 that is provided to the viewer can be customized to make it appear that the viewer is sitting in a particular part of the stadium venue such as a position proximate to the field or a position toward the upper-deck of the stadium venue. In another example, the soundscape output 124 that is provided to the viewer can be customized make it appear as if the viewer is sitting in a section of the stadium venue that is near other fans that are supporting the same team. In another embodiment, the soundscape output 124 may include crowd noise of fans supporting the home team being distributed on the left speakers of the viewer and crowd noise of fans supporting the away team being distributed on the right speakers of the viewer.

In some embodiments, the crowd simulator 122 is configured to augment the media event using the viewer reaction states 308*a*-308*n*. In one embodiment, the media event may be augmented with avatars that represent the viewers 102 of the media event. For example, a viewer watching a sporting event that is supporting the home team may have a viewer reaction state that includes an emotional state of "anger" because the referee made a bad call against the home team. The crowd simulator 122 may generate an avatar to represent the viewer expressing an "anger" emotion, e.g., clenched fists, gritted teeth, aggressive posture, etc. Conversely, a viewer watching the sporting event that is supporting the away team may have an emotional state of "happiness" since the referee made a call that is favorable to the away team. The crowd simulator 122 may generate an avatar representing the viewer expressing a "happiness" emotion, e.g., smiling, laughing, cheering, giving high-fives to other fans, etc.

Figure 5:
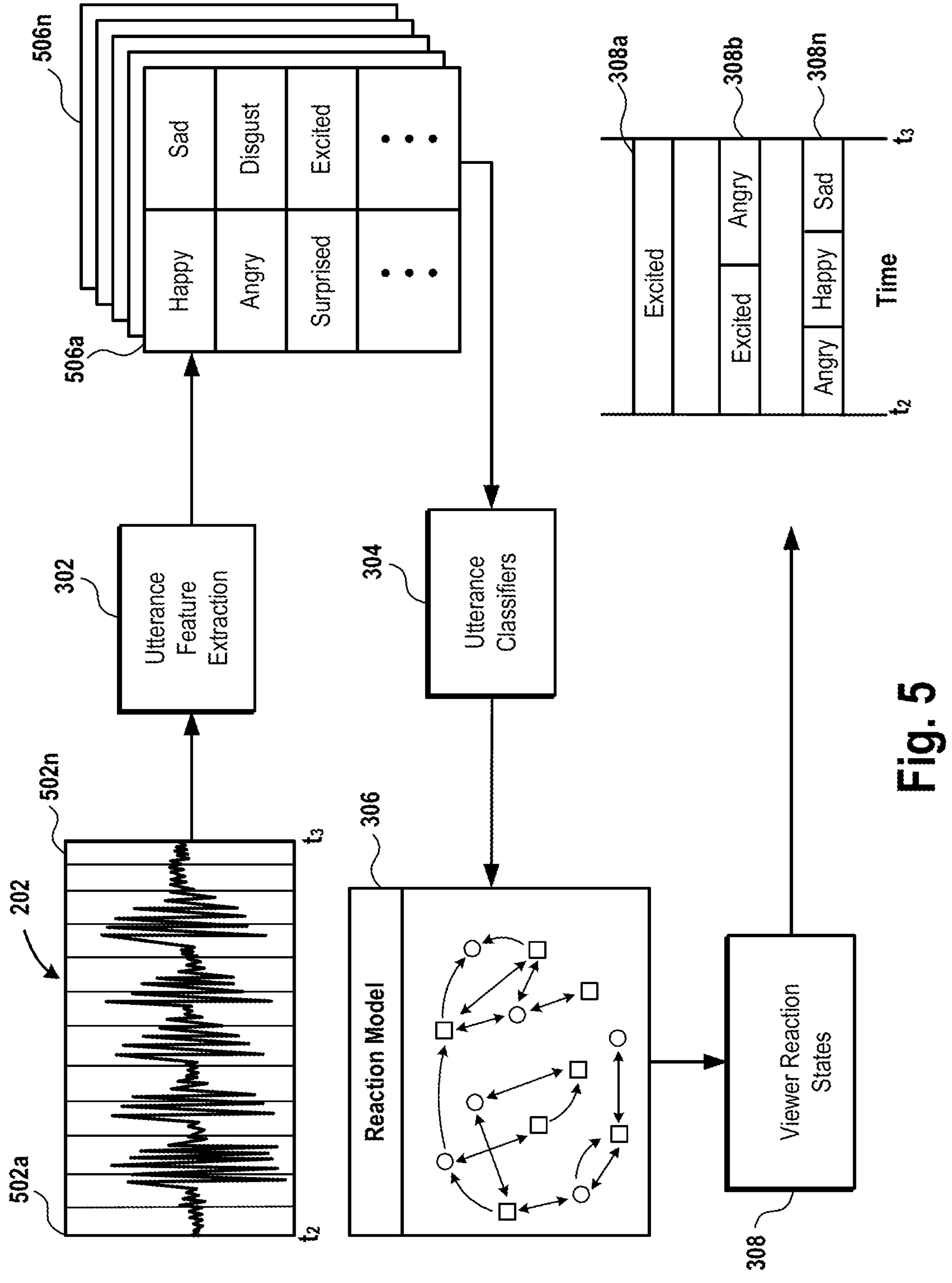
FIG. 5 illustrates an embodiment of a cloud service that is configured to process the utterances of a viewer to build a reaction model for identifying viewer reaction states of the viewer, in accordance with an implementation of the disclosure.

FIG. 5 illustrates an embodiment of a cloud service 116 that is configured to process the utterances 202 of a viewer 102 to build a reaction model 306 for identifying the viewer reaction states 308 of the viewer 102. As illustrated in FIG. 5, an utterance feature extraction 302 operation is configured to extract and identify features from the utterances 202 to generate a reaction feature matrix 504. In one embodiment, the utterances 202 of the viewer may be divided and segmented into different time slices 502*a*-502*n*. For example, utterance 202*a* may be divided into forty separate time slices. In one embodiment, each of the different separate time slices 502*a*-502*n* may have different reaction states that may occur during the particular time period. In some embodiments, the reaction feature matrix 504 may include a plurality of emotion profiles 506*a*-506*n* that correspond to the time slices 502*a*-502*n* of the utterances 202. In one embodiment, each emotion profile 506 may include various emotional states. For example, as illustrated in FIG. 5, emotion profile 506*a* corresponds to time slice 502*a* which includes emotional states such as happy, sad, angry, disgust, surprised, excited, etc.

After the features are identified by the utterance feature extraction 302 operation and the reaction feature matrix 504 is generated, an utterance classifiers 304 operation is configured to classify the extracted features associated with the utterances of the viewer. In some embodiments, the features are labeled using a classification algorithm for further refining by the reaction model 306.

In some embodiments, the reaction model 306 can be configured to receive as input the classified features from the utterance classifiers 304 operation. Using this input, the reaction model 306 can be used to for identifying viewer reaction states 308 of the viewer 102 which can be used for producing a soundscape for the crowd noise. As noted above, the viewer reaction states 308 may include various emotional characteristics corresponding to the utterances of the viewer such as joy, sadness, fear, anger, surprise, disgust, contempt, panic, etc. Over a period of time, the viewer reaction states may change and depend on the context of the media event. In one example, as illustrated in FIG. 5, at time period t2-t3, the emotional characteristics corresponding to the utterances of the viewer may include an emotional state of "excited." In another example, at time period t2-t3, the emotional characteristics corresponding to the utterances of the viewer may include a combination of different emotional states such as "excited" and "angry." In yet another example, the emotional characteristics corresponding to the utterances of the viewer may include a hybrid of different emotions such as "angry," "happy," and "sad." Accordingly, the viewer reaction states 308 may have one or more emotional states since the context of the media event is continuously changing which may result in the viewer having different emotional responses.

In some embodiments, the reaction model 306 may be configured to receive as input a profile associated with the viewers 102. The viewer profile may include various attributes associated with the viewer such as the viewer's favorite teams, players, interests, preferences, likes, dislikes, age, gender, etc. In one embodiment, the reaction model 306 is configured to use the viewer profile and the utterances of the viewer for identifying the viewer reaction states 308 associated with an utterance of the viewer. Other inputs that are not direct inputs or lack of input/feedback, may also be taken as inputs to the reaction model 306 for identifying the viewer reaction states 308.

In other embodiments, the cloud service 116 is configured to process face capture data that is captured by a camera 114 of the viewer. In one embodiment, the face capture data can be processed by the cloud service 116 to determine the emotions associated with the facial expression of the viewer when verbally expressing and reacting to the media event. These emotions can include, without limitation, fear, sadness, happiness, anger, etc. In one embodiment, the face capture data can be processed by a feature processing operation to identify features associated with the facial expressions of the viewer. Once the features are identified, a classifiers operation is configured to classify the features which can be used as input to build the reaction model 306 for identifying the viewer reaction states 308.

Figure 6:
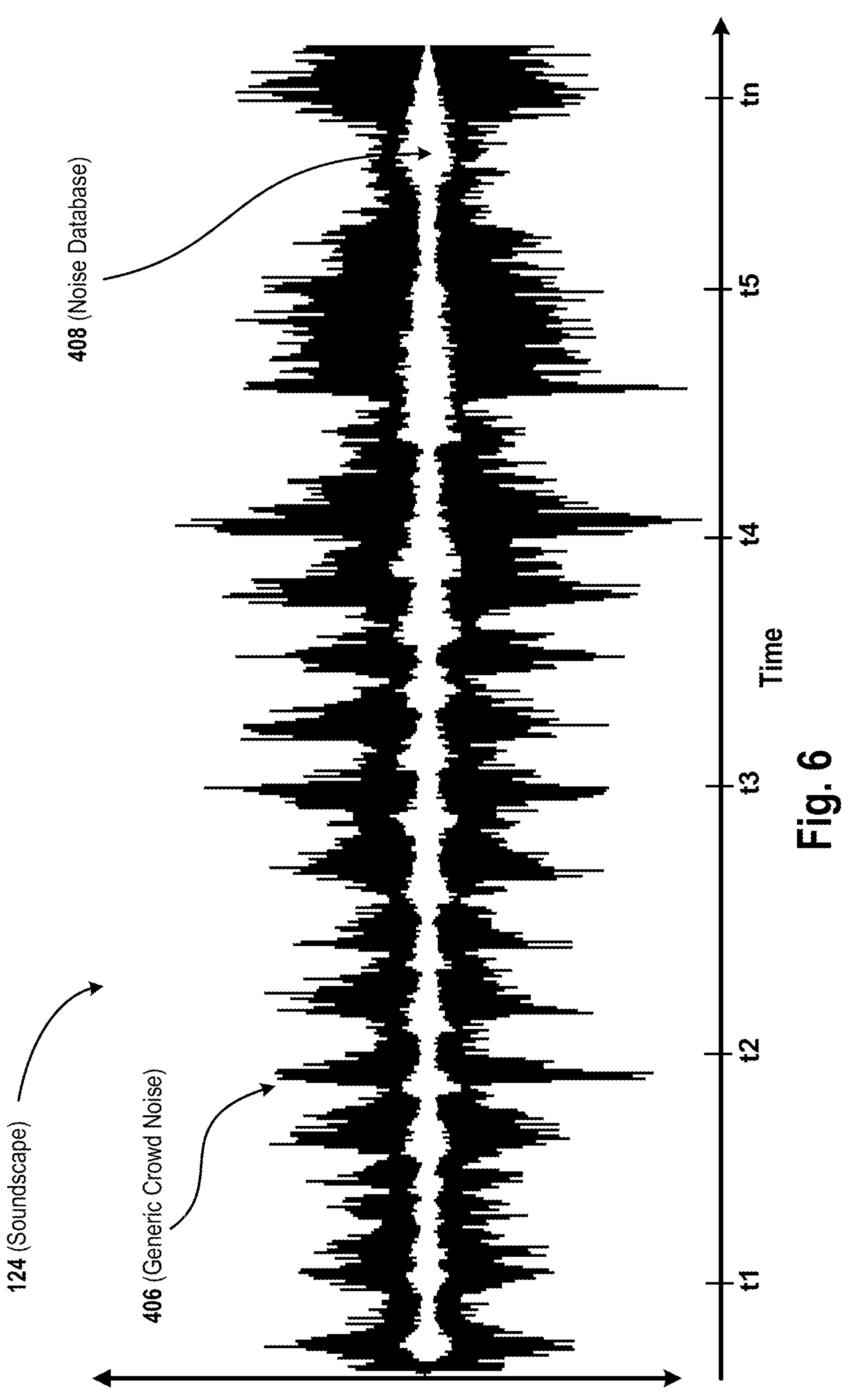
FIG. 6 is an exemplary illustration showing the audio signal waveform associated with the output soundscape, in accordance with an implementation of the disclosure.

FIG. 6 is an exemplary illustration showing the audio signal waveform associated with the output soundscape 410. As illustrated, the output soundscape 124 includes audio of generic crowd noise blended with audio corresponding to the viewer reaction states. e.g., crowd noise 410 and noise database 408.

FIG. 7 is an exemplary illustration showing a viewer customized soundscape output based on the preferences of the viewer. As shown, the table 702 includes a viewer identification 704 and customized soundscape output 708 for each viewer of the media event at a particular point in time 706. In one embodiment, the customized soundscape output 708 can be a combination of generic crowd noise 406 and audio corresponding to view reaction states 120. In some embodiments, the table may include a viewer personal setting 710 which can allow the viewer with further customization to the soundscape output based on the personal preferences of the viewer.

As illustrated in FIG. 7, each viewer 102 can customize how they would like their corresponding soundscape output distributed. For example, as illustrated, for viewer-1, at time tn, the customized soundscape output 708 includes 25% generic crowd noise, 20% happy, 10% angry, 10% sad, 10% stress, and 25% excited. The viewer personal setting 710 for viewer-1 also indicates that the viewer is supporting the home team and that the viewer selected an audio setting corresponding to a feature that corresponds to a value of "1." In one embodiment, the audio setting feature may vary and include a plurality of different type of customizable features that are selectable by the viewer.

In some embodiments, the soundscape output can be customized based on the selection of the viewer specifying whether they are a fan of the home team of the away team. For example, the selection of the home team may adjust the soundscape output such that the soundscape output emphasizes the crowd noise associated with the home team rather than the away team. In one embodiment, this may result in simulating the sound of the viewer sitting in a section of the venue near other fans of the home team.

In one embodiment, an audio setting feature may include adjusting the characteristics of the sound effects of the audio such as pitch, speed, timbre, loudness, etc. For example, if the viewer prefers to emphasize the sound of the women and children in the crowd, the viewer can make a selection to adjust the pitch of the audio to emphasize the utterances of the women and children.

In some embodiments, the soundscape output can be customized to emphasize or deemphasize the sound the crowd reacting to specific players, teams, or game actions in the media event. For example, the viewer can make a selection to emphasize the sound of the crowd cheering and showing support for a particular player participating in the sporting event while deemphasizing the negative reactions associated with the particular player.

In other embodiments, the soundscape output can be customized to emphasize the crowd noise that aligns with the same reactions, preferences and interests of the viewer. In one embodiment, the soundscape output can be customized such that the viewer only hears crowd noise that shows support for the team and players that the viewer is supporting and cheering for. For example, if the viewer verbally expresses the words, "nice pass!", in response to an action in the media event, the soundscape output may include the sound of the crowd reacting positively positive to the same game action.

In other embodiments, the soundscape output can be customized to emphasize the viewer reaction of friends viewing the media event or other individual viewers of the media event. For example, if a friend of the viewer is watching the media event, the soundscape output can be customized to emphasize the reactions of the friend while deemphasizing the reactions of the other viewers of the media event. In one embodiment, the soundscape output can be customized to include the actual utterances of the friend of the viewer or other specific viewers watching the media event. For example, if the friend of the viewer verbally expresses the phrase, "wooohooo!," this verbal expression can be incorporated into the soundscape so that the viewer can hear the friend verbally expressing the phrase, "wooohooo!."

In other embodiments, the magnitude of the soundscape output can be customized to represent a specific number of attendees watching the media event live in person. In one example, if only 1,000 attendees are viewing the media event live in-person, the magnitude of the soundscape output can be adjusted to simulate the sound of a crowd of 100,000 attendees watching the media event live in-person.

Figure 8:
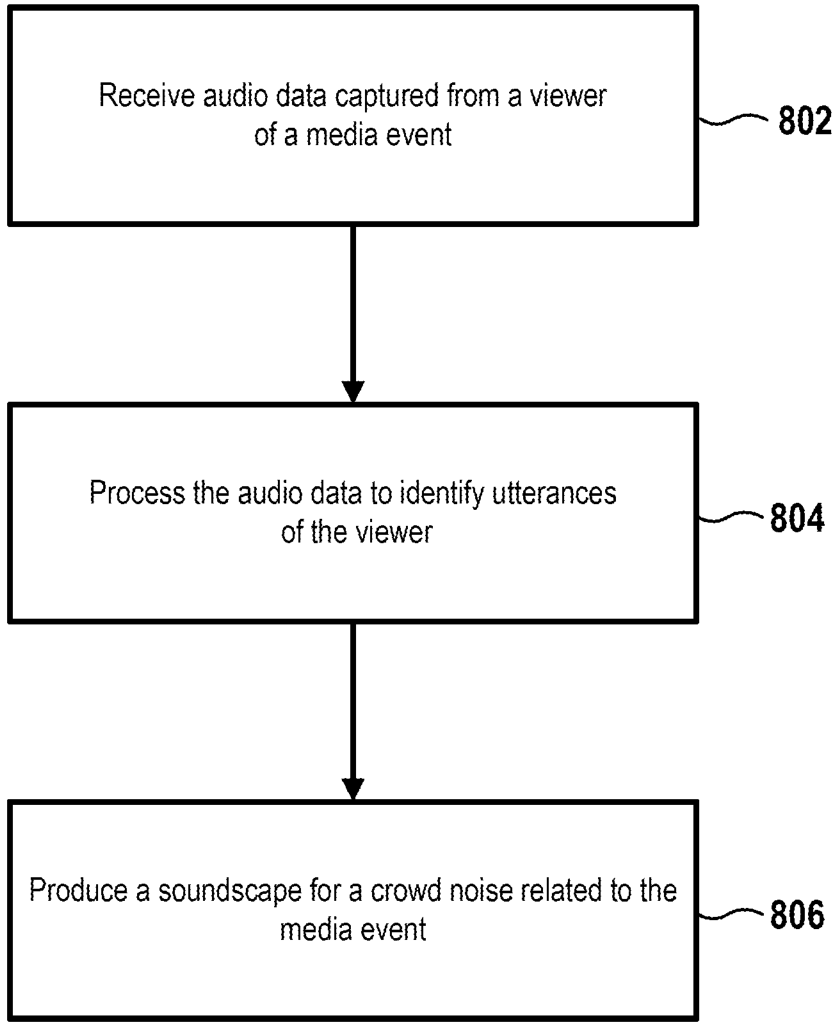
FIG. 8 illustrates a method for generating crowd noise related to a media event being presented using a cloud service, in accordance with an implementation of the disclosure.

FIG. 8 illustrates a method for generating crowd noise related to a media event being presented using a cloud service 116. In one embodiment, the method includes an operation 802 that is configured to receive audio data captured from a viewer 102 of the media event. For example, a plurality of viewers 102 may be watching a media evet such as an E-sports event from a remote location. While viewing the gameplay of players competing in an E-sports event, the plurality of viewers 102 may verbally react to the gameplay which may include the viewers cheering, yelling, shouting, talking, signing, laughing, crying, screaming, or making other utterances in response to the game actions in the E-sports event. In other embodiments, operation 802 can simultaneously capture the voice output from the plurality of viewers 102 and be able to distinguish the voice output of each viewer. In other embodiments, operation 802 is configured to capture comments of the viewer that are provided by the viewers via a selection from a menu or via typing of comments and text using a device of the viewer. In other embodiments, operation 802 is configured to receive face capture data that is captured by a camera while the viewer watches the media event.

The method shown in FIG. 8 then flows to operation 804 where the operation is configured to process the audio data to identify utterances of the viewer. In some embodiments, operation 804 may include an utterance feature extraction 302 operation that is configured to extract and identify features from the utterances 202 of the user. In other embodiments, operation 804 may include an utterance classifiers 304 operation that is configured to classify the extracted features associated with the utterances of the viewer. In some embodiments, operation 804 is configured to use the classified features to build a reaction model 306 for identifying reaction states of the viewer 102.

The method flows to operation 806 where the operation is configured to produce a soundscape output 124 for the crowd noise related to the media event. In some embodiments, operation 806 is configured to blend together audio of generic crowd noise related to the media event and audio corresponding to the reaction states of the viewer to produce the soundscape output 124. In some embodiments, after producing the soundscape output 124, operation 806 is configured to send the soundscape output 124 to the viewers 102 of the media event. In one embodiment, soundscape output 124 is output to a speaker associated with presentation of the media event to the viewer.

Figure 9:
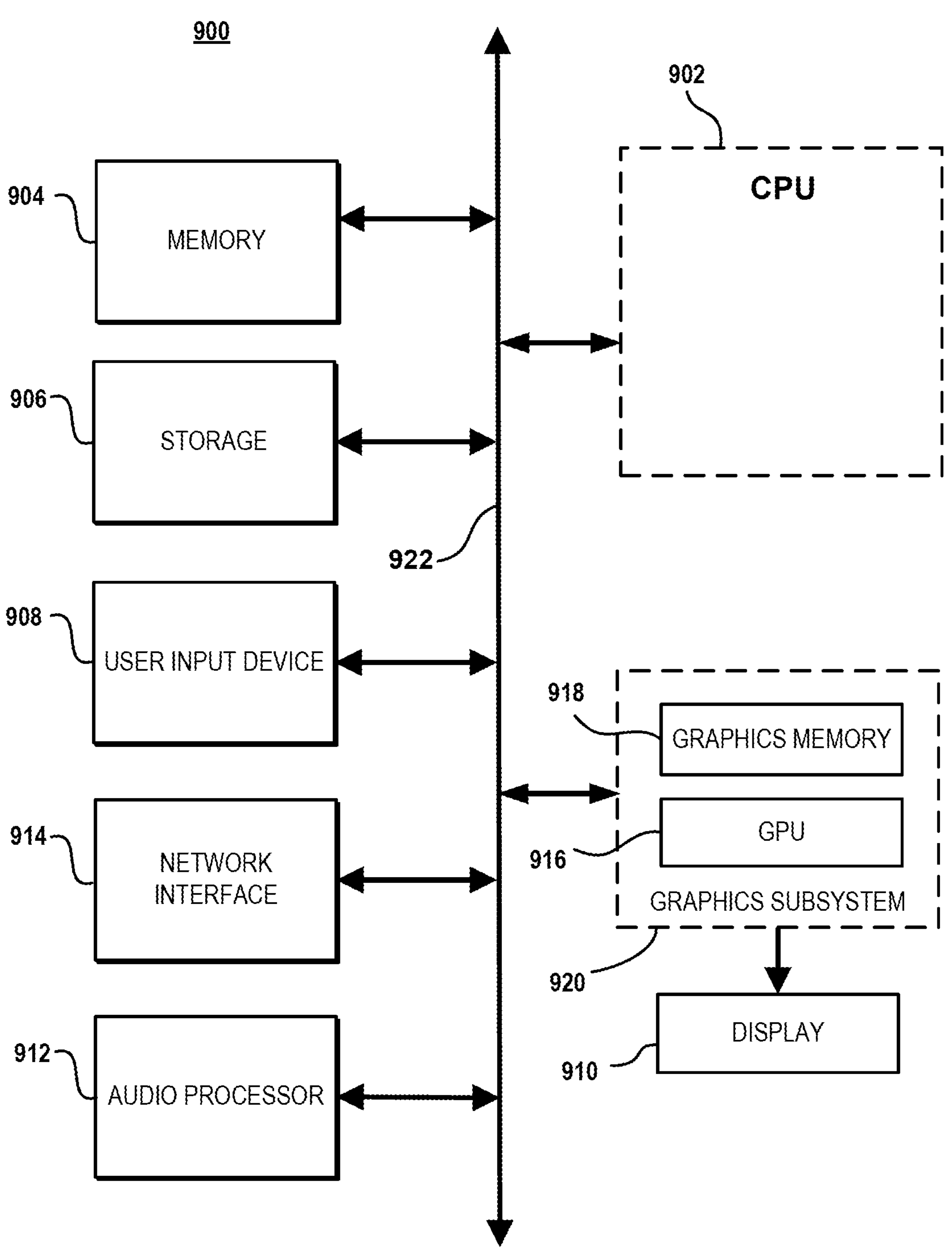
FIG. 9 illustrates components of an example device that can be used to perform aspects of the various embodiments of the present disclosure.

FIG. 9 illustrates components of an example device 900 that can be used to perform aspects of the various embodiments of the present disclosure. This block diagram illustrates a device 900 that can incorporate or can be a personal computer, video game console, personal digital assistant, a server or other digital device, suitable for practicing an embodiment of the disclosure. Device 900 includes a central processing unit (CPU) 902 for running software applications and optionally an operating system. CPU 902 may be comprised of one or more homogeneous or heterogeneous processing cores. For example, CPU 902 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 900 may be a localized to a player playing a game segment (e.g., game console), or remote from the player (e.g., back-end server processor), or one of many servers using virtualization in a game cloud system for remote streaming of gameplay to clients.

Memory 904 stores applications and data for use by the CPU 902. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 908 communicate user inputs from one or more users to device 900, examples of which may include keyboards, mice, joysticks, touch pads, touch screens, still or video recorders/cameras, tracking devices for recognizing gestures, and/or microphones. Network interface 914 allows device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of device 900, including CPU 902, memory 904, data storage 906, user input devices 908, network interface 910, and audio processor 912 are connected via one or more data buses 922.

A graphics subsystem 920 is further connected with data bus 922 and the components of the device 900. The graphics subsystem 920 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 908, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 914 periodically outputs pixel data for an image from graphics memory 918 to be displayed on display device 910. Display device 910 can be any device capable of displaying visual information in response to a signal from the device 900, including CRT, LCD, plasma, and OLED displays. Device 900 can provide the display device 910 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:

receiving audio data captured from a viewer of a media event;

processing the audio data to identify utterances of the viewer, wherein features of the utterances are classified to build a reaction model for identifying reaction states of the viewer, the reaction states including one or more emotion types, wherein the one or more emotion types are: (I) associated with the utterances and (II) scored by the reaction model, the scores corresponding to an intensity associated with corresponding utterances;

producing a soundscape for crowd noise, wherein the soundscape blends together first audio of generic crowd noise related to the media event and second audio that simulates noises based at least in part on one or more of said reaction states of the viewer, wherein the second audio is generated from one or more sounds of a plurality of sounds, the one or more sounds corresponding to a meaning of the utterances of the viewer and selected from a database based at least in part on the score; and transmitting the soundscape for output at a speaker.

2. The method of claim 1, further comprising:

the media event is being presented to a plurality of additional viewers;

receiving audio data captured from said plurality of additional viewers;

processing the audio data of the additional viewers to identify utterances of the additional viewers, wherein the reaction model is used to identify reaction states of the additional viewers; and augmenting the produced soundscape for the crowd noise to blend additional audio corresponding to said reaction states of said additional viewers.

3. The method of claim 2, wherein the soundscape, as augmented, is output to respective speakers associated with presentation of the media event to the additional viewers.

4. The method of claim 1, wherein the second audio is customizable based on received preferences of the viewer.

5. The method of claim 1, further comprising:
processing additional reaction states of other viewers of the media event;
identifying audio corresponding to the additional reaction states; and
augmenting the produced soundscape to additionally include blending of said audio corresponding to the additional reaction states of the other viewers.

6. The method of claim 5, wherein the soundscape is presented to said viewer and one or more of said other viewers as output to speakers when viewing said media event.

7. The method of claim 1, wherein the media event is a live event or an event being viewed as a group by the viewer and other viewers.

8. The method of claim 1, wherein the second audio is generated based on one or more semantic equivalents of the utterances without replicating the utterances of the viewer.

9. The method of claim 1, wherein the second audio is accessed from a database of pre-recorded audio files, wherein said pre-recorded audio files are tagged with an emotional score and used for selecting the audio corresponding to one or more of said reaction states of the viewer.

10. The method of claim 1, wherein the reaction model implements a machine learning engine that is configured to identify the features of the utterances to classify attributes of the viewer, wherein the attributes of the viewer are used to identify the reaction states of the viewer.

11. A system comprising:
one or more processors; and
one or more memories storing instructions that, upon execution by the one or more processors, configure the system to:
receive audio data captured from a plurality of viewers of a media event;
process the audio data to identify utterances of the plurality of viewers, wherein features of the utterances are classified to build a reaction model for identifying reaction states of the plurality of viewers, wherein the reaction states include one or more emotion types, wherein the emotion types are: (I) associated with the utterances and (II) scored by the reaction model, the scores corresponding to an intensity associated with corresponding utterances; and
produce a soundscape for crowd noise, wherein the soundscape blends together first audio of generic crowd noise related to the media event and second audio that simulates noises that correspond to one or more of said reaction states of the plurality of viewers, wherein the second audio corresponds to a semantic equivalent of the utterances of a viewer of the plurality of viewers, the second audio generated from one or more sounds of a plurality of sounds selected from a database based at least in part on the score.

12. The system of claim 11 further comprising transmitting the soundscape for output at a speaker.

13. The system of claim 11, wherein the soundscape is customizable based on received preferences of the plurality of viewers.

14. The system of claim 11, wherein the media event is a live event or a recorded event being viewed by the plurality of viewers as a group or separately in different geographical locations.

* * * * *